C. A. PERSONS.
BICYCLE PEDAL.
APPLICATION FILED SEPT. 14, 1920.
1,425,215.
Patented Aug. 8, 1922.
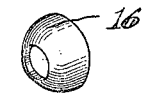
Fig.4.
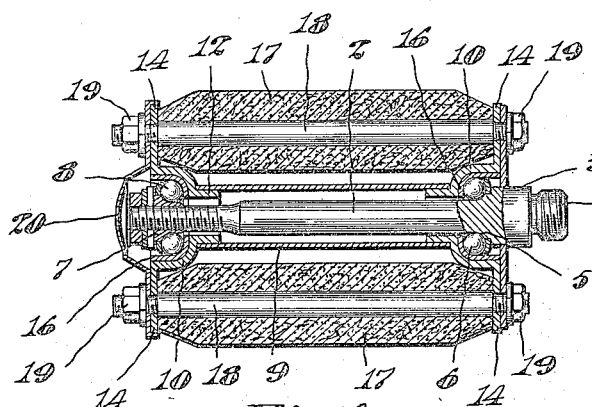
Fig.1.
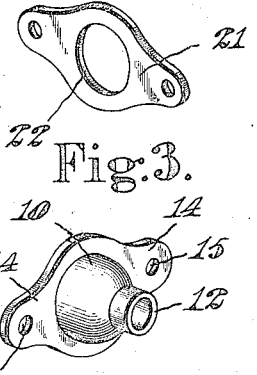
Fig.3.
Fig.2.
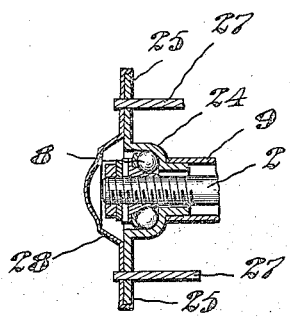
Fig.5.
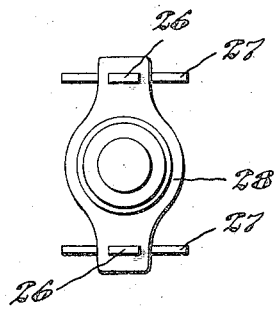
Fig.6.
INVENTOR
Charles A. Persons,
By his Attorney,
J. H. McCready

UNITED STATES PATENT OFFICE.

CHARLES A. PERSONS, OF WORCESTER, MASSACHUSETTS.

BICYCLE PEDAL.

1,425,215.  Specification of Letters Patent.  Patented Aug. 8, 1922.

Application filed September 14, 1920. Serial No. 410,254.

*To all whom it may concern:*

Be it known that I, CHARLES A. PERSONS, a citizen of the United States, residing at Worcester, in the county of Worcester and State of Massachusetts, have invented certain Improvements in Bicycle Pedals, of which the following description, in connection with the accompanying drawings, is a specification, like reference characters on the drawings indicating like parts in the several figures.

This invention relates to pedals of bicycles, velocipedes and the like, and it has for its chief object to devise a pedal construction which will have a longer life than the constructions heretofore proposed, which can be readily repaired, and which can be manufactured more economically than prior constructions.

The nature of the invention will be readily understood from the following description when read in connection with the accompanying drawings, and the novel features will be particularly pointed out in the appended claims.

Referring now to the drawings,

Figure 1 is a cross sectional view of a pedal constructed in accordance with the present invention;

Fig. 2 is an angular view of one of the ball cups of the pedal shown in Fig. 1;

Fig. 3 is an angular view of the dust cap used in the pedal shown in Fig. 1;

Fig. 4 is an angular view of one of the hardened bearing linings of the pedal shown in Fig. 1;

Fig. 5 is a cross sectional view through the outer end of the pedal showing a modified construction; and Fig. 6 is an end view of the construction shown in Fig. 5.

The construction shown in Figs. 1 to 4 inclusive comprises a spindle or axle 2, substantially of the usual form, having a head 3 at the inner end of the pedal, and a threaded stud 4 projecting beyond said head to be screwed into the crank. This spindle also is provided with a concave shoulder 5 to receive one set of balls 6, and it is threaded at its opposite end to receive a cone 7 which forms one of the bearing members for the other set of balls 8. This cone 7 is held in place by the usual washer and nut.

A barrel 9 consisting of a short piece of metallic tubing encircles the spindle 2 and forms a spacing device for two ball cups 10—10 of novel construction. That is, these ball cups preferably are made from sheet metal by the punch and die process, each cup being provided with a tubular extension 12 at its inner end which fits snugly into one end of the barrel 9. Each ball cup also is provided with a flange-like head, as clearly shown in Fig. 2, which comprises two arms or wings 14—14 that project laterally in opposite directions from the outer edge of the cup portion proper, and each arm has a hole 15 punched therein. A hardened bearing lining 16 is fitted into each ball cup 10, these two member 16—16 cooperating with the shoulder 5 and the cone 7 to form the bearings for the two sets of bearing balls 6 and 8.

The pedal shown in Fig. 1 is provided with rubber tread pieces 17—17 at opposite sides of the barrel and each of these pieces is provided, as usual, with a central rod 18 threaded at its opposite ends to receive nuts 19 and lock washers by means of which the arms of the ball cups at the opposite ends of the pedal are drawn toward each other, and secured to the tread members.

A dust cap also is provided at each end of the pedal, that at the outer end consisting of a sheet metal cap 20 which is held in position by the two nuts 19—19 at this end of the pedal, and this cap prevents the entrance of dust into the outer bearing 8. At the inner end of the pedal, instead of the usual arrangement, a dust cap 21 is provided consisting of a plate, of substantially the form shown in Fig. 3, secured in place by the nuts 19—19 at this end of the pedal, this cap having a central hole 22 therethrough in which the head 3 of the spindle fits snugly.

It will now be appreciated that the construction herein described can be manufactured very economically due particularly to the fact that the ball cups are made of sheet material and have the arms or wings 14 formed integral with them, this construction avoiding the necessity for turning the ball cups as has heretofore been considered necessary in pedals of the better grades. At the same time the hardened linings 16 provide a good bearing surface to cooperate with the bearing balls, and if after long service these linings should be worn out they can readily be removed and replaced by new ones. This construction also has the advantage of using larger balls than has heretofore been the practice, thus providing a pedal of longer life.

The dust cap 21 at the inner end of the pedal also constitutes an improvement since it not only effectually prevents the entrance of dust into the bearing at this end of the pedal but it also permits the manufacture of the spindle from stock of a small diameter since the head 3 can, with this construction, be made of less diameter than has been necessary in prior constructions.

While the construction shown in Fig. 1 includes rubber tread pieces, it will readily be seen that the same features of construction can be used in a pedal of the rat-trap type. It will also be seen that instead of using separate lining pieces for the ball cups, the ball cups themselves can be hardened. A construction including these features is sufficiently shown in Figs. 5 and 6 to enable those skilled in this art readily to understand it. The construction here shown is essentially like that illustrated in the figures above referred to except for the differences just described. That is, the ball cup 24 has the same general shape as the ball cup 10 but is made of suitable dimensions to receive the bearing balls 8 and is hardened so that it will have the proper wearing qualities. This member also instead of being provided with wings or arms 25 having round holes punched therein, is provided with slots to receive the ends 26—26 of the usual tread pieces 27—27 of a rat-trap pedal, these ends being riveted over the wings of the dust cap 28 to hold both the cap and the ball cups in their proper positions in the pedal.

What is claimed as new is:

1. In a bicycle pedal, the combination of a spindle, a barrel encircling said spindle, a ball cup at each end of said barrel, arms integral with each cup and extending laterally therefrom in opposite directions, a hardened ball lining in each of said cups, and means at opposite sides of said barrel connecting the arms of said cups at the opposite ends of the pedal.

2. In a bicycle pedal, the combination of a spindle, a barrel encircling said spindle, a ball cup at each end of said barrel, arms integral with each cup and extending laterally therefrom in opposite directions, means connecting the arms of said cups at opposite ends of the pedal, ball bearings in said cups, a dust cap at the inner end of said pedal closely surrounding said spindle and secured in place by said means.

3. In a bicycle pedal, the combination of a spindle, a ball bearing at the outer end of said spindle and including a ball cup, means connecting said ball cup to the other parts of the pedal, and a sheet metal dust cap at said outer end of the pedal having a peripheral flange encircling said ball cup.

In testimony whereof I have signed my name to this specification.

CHARLES A. PERSONS.